Jan. 2, 1968   M. J. LAMPE ET AL   3,361,054
FOOD PROCESSING MACHINE
Filed Oct. 31, 1966   3 Sheets-Sheet 1
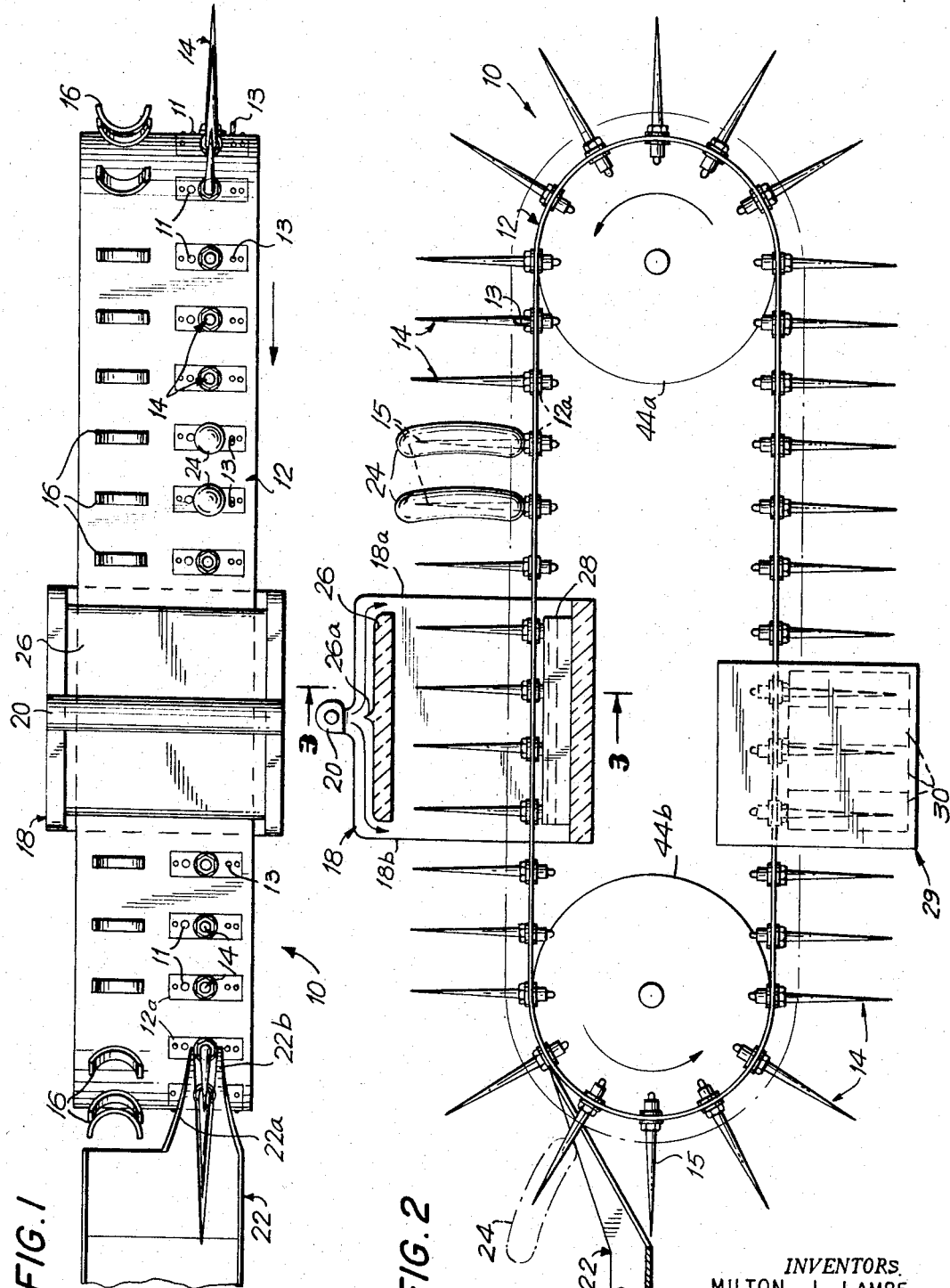
INVENTORS.
MILTON J. LAMPE
EDWIN M. RIMSKY
BY
Amster & Rothstein
ATTORNEYS

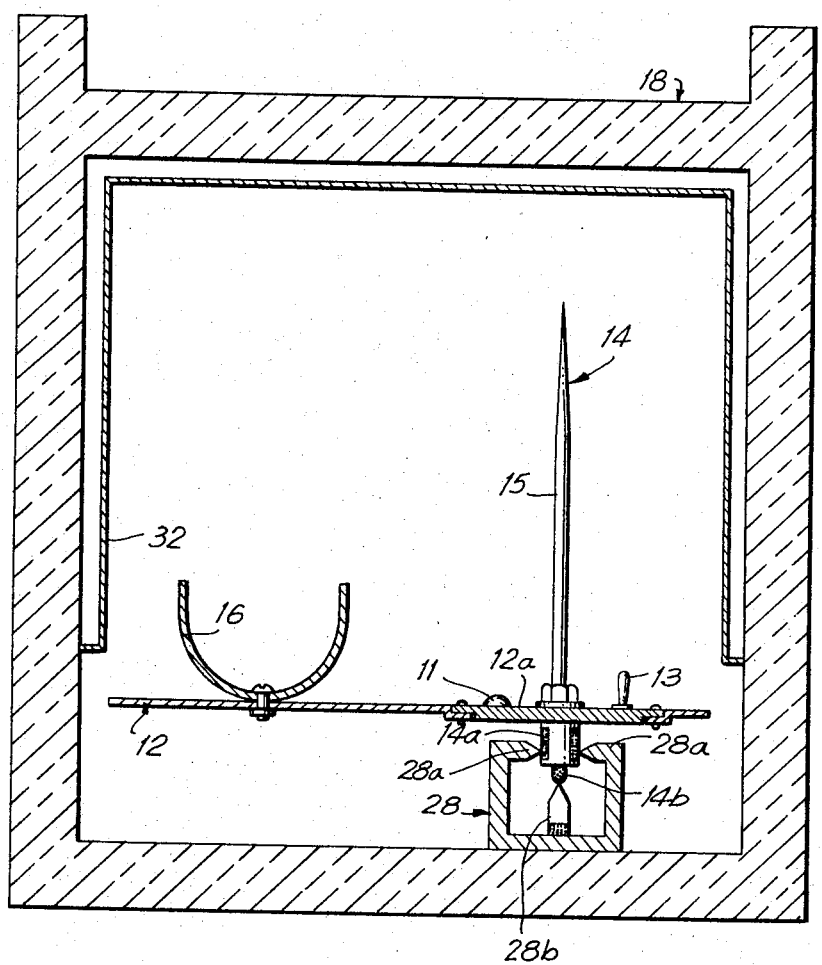

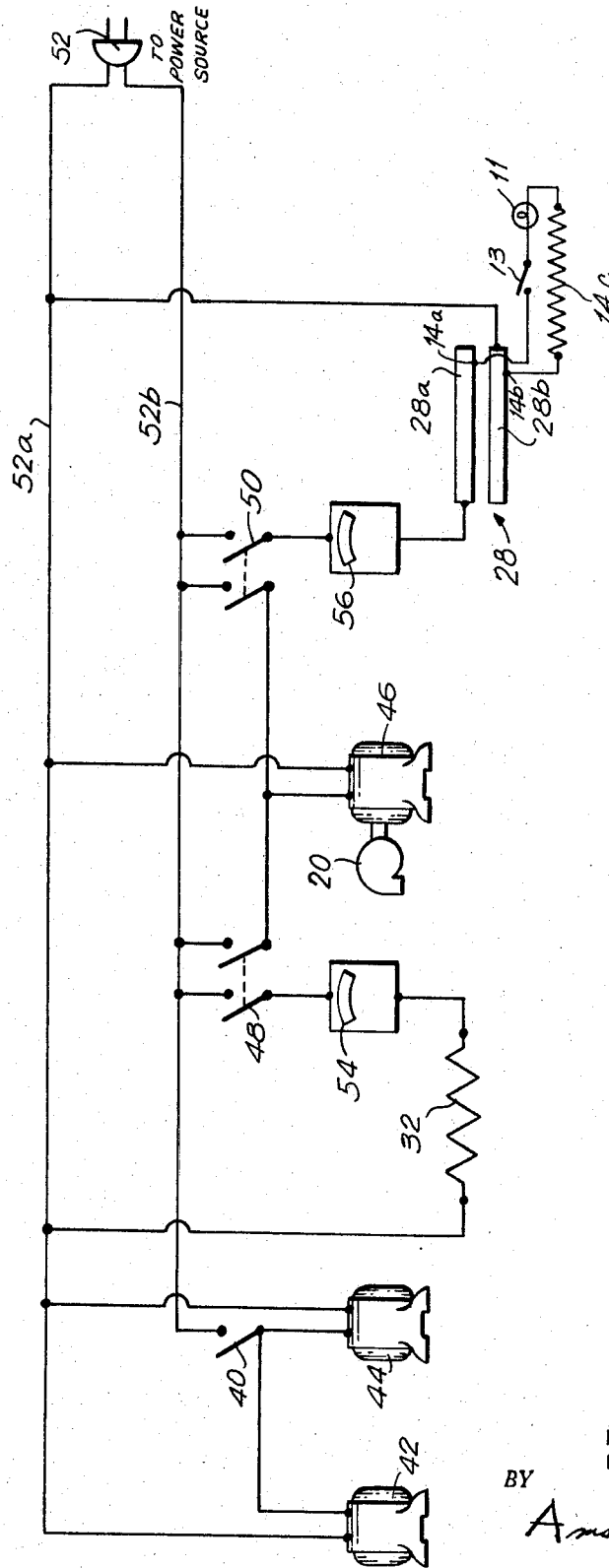

United States Patent Office 3,361,054
Patented Jan. 2, 1968

3,361,054
FOOD PROCESSING MACHINE
Milton J. Lampe, 1007 Greenfield Road, Woodmere, N.Y. 11598, and Edwin M. Rimsky, Charlotte, N.C.; said Rimsky assignor to said Lampe
Filed Oct. 31, 1966, Ser. No. 590,846
7 Claims. (Cl. 99—420)

ABSTRACT OF THE DISCLOSURE

An oven-type device for cooking food products as they pass through the device on a conveyor belt. The individual food products are mounted on spikes which are carried by the conveyor. As the mounted food products pass through an oven, they can be cooked externally; internal cooking is provided by electrifying the spikes and by completing the spikes' electrical circuits selectively while they travel through the oven.

---

This invention relates to improved apparatus for processing food products, and more specifically, to equipment for achieving more uniform heating of such food products in the cooking thereof.

The consumption, both within and outside of the home, of ready-to-eat and similar food products has increased significantly in recent years. Moreover, the pace of everyday activities in contemporary society has created a need for efficient and relatively rapid preparation of a wide variety of such foods. However, it is important that these new methods of food preparation take into account both existing food products, which require particular kinds of heat treatment, and newly developed food products, which require correspondingly newer preparation techniques. In a similar vein, this field is so broad in scope as to span food preparation by the consumer in his home, food preparation in the restaurant or "snack shop," the vending machine (both stationary and portable) environment, etc.

While this general problem of proper preparation of various food products has been approached many times in the past, the solutions arrived at have not always been entirely satisfactory. For example, a typical illustrative food product, the preparation of which has been considered previously, is the so-called "hot dog" or frankfurter. Just considering this product for the sake of description, various techniques have been proposed for convenient preparation of the frankfurter. Thus, the prior art includes devices which convey one or more frankfurters through a heated oven, whereby external heating of the frankfurter occurs. Then, too, there is equipment which uses an internal heating approach by electrifying two or more spikes or shafts and impaling the frankfurters thereacross to complete an electrical circuit, thus providing limited heating from within the frankfurter.

However, the prior art has failed to place adequate emphasis on the proper and uniform heat treatment required for frankfurters, as well as for many other established and newly developed food products. Little thought has been given to more effective techniques for preparing some of the more recently developed and highly popular food products, as well as providing equipment which is equally compatible with already existing products. Thus, whereas equipment is available for either internal or external heating of frankfurters, for example, hardly any attention has been paid to the various new sandwich-type food products which require suitable heat treatment as well as to the rapidly burgeoning field of pre-packaged foods.

It is therefore an object of this invention to provide food preparation equipment to obviate one or more of the aforesaid difficulties.

It is also an object of this invention to provide readily operable heat treatment apparatus for the preparation of a wide variety of food products to achieve a wholesome and appetizing result.

It is still another object of this invention to furnish equipment for selectively heating food products internally and/or externally, at the option of the operator.

In one particular illustrative embodiment of this invention, a motorized conveyor belt has mounted thereon a plurality of food-carrying elements, which may be of differing shapes depending upon the type of food product involved. Suitable interchangeability can be built into the conveyor belt in order to permit replacement of the food-carrying elements from time to time. Illustratively, these elements can occupy one or more rows along the conveyor belt, and can take the shape, for example, of semicircular saddles (for relatively loose mounting of food products) and spike-shaped elements (on which various food products can be impaled).

The conveyor belt is arranged to transport the mounted saddles and spikes through a heating oven which can be externally controlled both as to its energization and the degree of heat provided thereby. Any food products mounted on the saddles and/or spikes will be externally heated during the passage of the conveyor belt through the oven. The selective heating technique of the invention provides a bayonet-type mounting at the lower portion of the oven to contact at least two terminals of the spike elements to provide a coaxial electrification of each individual spike element. That is, as the respective spikes pass through the mounting in the oven, appropriate electrical contact is made with the underside thereof. Since the spike terminals are insulated from each other, power from both sides of the line (e.g., an alternating current source) can be applied to the individual spikes and thereby heat them to the desired temperature by virtue of internal and individual electrification (i.e., resistance heating).

The electrical circuit to heat each of the spikes is maintained until the spike has been transported through the mounting within the oven, at which time electrical contact is broken and the impaled food product leaves the oven having been cooked internally by the electrification of the spikes and externally by the application of the suitable heating temperature from the open itself. Products which do not require any internal heating can be placed in the adjacent saddle mountings, and accordingly they will only receive the external heating of the oven. Of course, since the spikes and the oven can be separately controlled as to their temperature (or even as to being on or off), a complete spectrum of heat treatment control is provided over the various food products. The speed of the conveyor belt is adjustable and can be varied so as to provide the proper amount of heat exposure, both internal and external as the case may be, to cook a wide variety of food products.

The conveyor belt is disposed at either end around respective shafts connected to one or more conveyor motor controls. For example, one possible arrangement provides for the belt to pass over a rotatable shaft at a "feed" end whereat food products are placed on the various mounted elements on the conveyor belt. The belt also can pass over a driven shaft at a "discharge" end of the apparatus. It will be apparent to those skilled in the art that various other driving arrangements can be utilized in connection with the conveyor belt of the present invention.

Following the cooking cycle whereby the belt is transported through the oven, the mounted food products pass to the discharge end of the apparatus. At that point, in their cooked form, the products are removed from their respective carrying elements and are collected for distribution, dispensing, etc. The oven itself is arranged to have at both its entry and exit ports, an air curtain to retain as much heat as possible within the oven space. The air curtain is activated when either the oven heating element or the spike-heating mounting is energized.

The conveyor belt is arranged to be continuous in nature, with several spike elements and saddles mounted along its entire length. The continuity of the belt also permits the spike elements, which may have been carrying greasy food products, to be passed through a cleaning unit containing appropriate grease and stain removing equipment. The cleaning station can be located at the underside of the apparatus to permit the mounted food-carrying elements to be passed therethrough following the removal of the cooked food products.

In order to provide for increased individualized control over the heating of the spike elements, additional instrumentation, such as a control switch for each spike element, can be utilized. Thus in order to internally heat only those spike elements which are carrying food products, an individual switch can be thrown at the time of loading to permit electrification of such a spike element. Various arrangements can be employed to indicate the state of any given spike element.

It is therefore a feature of an embodiment of this invention that a spike-shaped heating element is controlled so as to internally heat mounted food products over a wide span of temperatures It is a further feature of an embodiment of this invention that switching apparatus is employed to control the heating of spike-shaped heating elements in response to the mounting thereon of food products.

Another feature of an embodiment of this invention includes means to provide external heating apparatus whereby wide ranges of external heat treatment can be achieved.

Still another feature of an embodiment of this invention is the provision of a heater mounting within a cooking apparatus oven to heat conveyorized food carrying elements on an individual basis.

A still further feature of an embodiment of this invention is means for retaining substantially all of the oven-produced heat within the oven space.

The above brief description, as well as further objects, features and advantages of the present invention, will be more fully appreciated by reference to the following detailed description of a presently preferred, but nonetheless illustrative embodiment demonstrating objects and features of the invention, when taken in conjunction with the accompanying drawing, wherein:

FIG. 1 is a plan view of a conveyor belt having food-carrying elements mounted thereon, indicating the passage of the belt through an oven and the means for removing cooked food products;

FIG. 2 is a side view of the cooking apparatus illustrated in FIG. 1, showing illustrative food products mounted on typical food-carrying elements, and passage of the conveyor belt through the oven and a cleaning station;

FIG. 3 is an enlarged sectional view of the oven of the cooking apparatus, indicating the passage of a portion of the conveyor belt therethrough, taken along the line 3—3 of FIG. 2 in the direction of the arrows; and FIG. 4 is an electrical wiring diagram for the cooking apparatus of the present invention.

Considering FIGS. 1 and 2 together, a cooking apparatus 10 is illustrated as having a continuous conveyor belt 12 with two rows of food-carrying elements 14 and 16 mounted thereon. While a variety of shapes and sizes of food-carrying elements is possible and will be apparent to those skilled in the art, the shapes illustrated are those of a spike 14 (having elongated pointed shaft 15) and a semicircular saddle 16. As many or as few of these elements can be mounted on the conveyor belt as the length of the belt and the required inter-element spacing (dependent upon the food product, for example) permits. The belt 12 is arranged to travel in the direction of the arrow in FIG. 1 (and see shaft rotation directional arrows in FIG. 2). This direction takes the various food-carrying elements 14 and 16 through an oven 18 equipped with an upper air curtain fan 20. The open shape of the saddles 16 permits food mounted thereon to be simply deposited at the discharge end of the belt (at the left in FIGS. 1 and 2) when the saddles 16 are disposed generally horizontally. The products mounted on the spikes 14 will be removed upon the entry of the spikes 14 into the bifurcated space between tines 22a and 22b of the discharge fork 22 (see FIGS. 1 and 2).

In addition to the individualized heating control provided for the spikes 14 (to be described in detail below with respect to FIGS. 3 and 4), there are separate controls to establish a wide range of heating temperatures within the oven 18. Moreover, on-off control for each of spikes 14 is also provided by illustrative toggle switches 13, the state of which is visually indicated by the condition of respective bulbs 11. (It is noted that spike elements 14, and respective switches 13 and bulbs 11 are mounted on a unitary structure 12a which can be fitted into an appropriate slot in the belt 12 for replacement and repair purposes.)

Food products such as typical frankfurters or similar foods 24 are mounted on the shafts 15 of spikes 14 (at which time individual switches 13 can be thrown), with accompanying rolls, buns, etc. being placed in the curve of the saddles 16 (depending upon the bun size, a bun may occupy more than one saddle 16). In order to retain as much heat as possible within the oven 18, an air curtain technique is employed by this invention. For example, fan 20 is mounted at the upper side of the oven 18 and is ducted into the top of the oven in a manner whereby a continuous stream of air passes from the blower 20 and, divided by the air splitter 26a of the duct element 26, creates air curtains at the entry port 18a and the exit port 18b of the oven 18. Accordingly, most of the heat generated within the oven is retained therein and yet no undue contact between the mounted food products and any mechanical door or heat-retaining member occurs.

A cleaning station unit 29 is located in the path of the conveyor belt 12 when its mounted food-carrying elements are in their inverted positions. This follows the removal of the various food products and can include, for example, counter-rotating brushes 30 to remove various grease and other similar stains or retained contaminants (to avoid spoilage, dripping, etc.) from the spikes 14. Various cleaning techniques, apparent to those skilled in the art, are applicable to this invention.

Referring to the enlarged sectional view of FIG. 3 showing the oven and the conveyor belt portion included therein, the oven 18 is seen to be heated by an electrified element 32 which surrounds the effective transportation space of the conveyor belt elements 14 and 16. Thus, while external heat is created by the element 32, individualized control is provided for each of the spikes 14 by virtue of bayonet-type bus bar or mounting 28. Specifically, the illustrated spike 14 includes a coaxial-type base having cylindrical contact surface 14a and downwardly projecting contact nipple 14b. These contact points underlie the conveyor belt 12 and accordingly do not interfere in any way with any food preparation, loading or discharge steps. In order to electrify each of the spikes 14, the mounting 28 includes spaced jaws 28a connected to one side of a power source (see FIG. 4) and an upwardly projecting contact edge 28b connected to the other side of the power source. This type of mounting structure is shown merely for illustrative purposes, and various other embodiments, including flexible spaced strips, channels, clips, etc., are applicable herein.

As a typical spike 14 with its corresponding switch 13 thrown passes through the mounting 28 (see the four spikes shown within the mounting in FIG. 2), and following the electrification of the mounting, electrical contact is made between the jaws 28a and the cylindrical contact surface 14a, as well as between the downwardly projecting contact nipple 14b and the upwardly projecting electrified edge 28b. This completes an electrical circuit (to be described below with respect to FIG. 4) through the shaft 15 (covering a typical heating wire, not shown in FIG. 3, but electrically shown as element 14c in FIG. 4) of spike 14, and thus individualized heating of a typically mounted food product thereon occurs.

A typical cooking cycle for food products mounted on the carrying elements 14 and 16 can commence, in this illustrative description, with the throwing of switch 40 in FIG. 4 to thereby energize the conveyor belt motor 44 and the cleaning station motor 42. Due to the connection of these two motors to a power source (not shown) through plug 52, having conductors 52a and 52b connected thereto, the conveyor belt begins to move and the cleaning station brushes 30 begin to rotate. Depending upon the type of heating control desired, various steps can now be taken. For example, if a frankfurter or other similar food product which, for best food preparation, should be heated both internally or externally, is involved, then both switches 48 and 50, energizing respectively the oven element 32 and the contact mounting 28, should be thrown. This provides electrification of the mounting jaws 28a and 28b (FIGS. 3 and 4), the circuit thereacross only being completed when the spike 14 passes into the oven 18 (see FIG. 2) after the individual switch 13 has been thrown (generally at the time of loading). Viewing the symbolic electrical representation of a spike having contacts 14a and 14b between conductors 28a and 28b in FIG. 4, it is seen that actual heating of illustrative heating element 14c of such a spike is also controlled by the position of individual switch 13. When a food product is loaded on a spike 14 and the corresponding switch 13 is thrown, corresponding indicator bulb 11 will light when the spike reaches mounting 28—failure to light is an indication of a probable heating element defect.

Supervisory control, including appropriate metering, over the oven heating and the mounting heating is provided by respective control units 54 and 56. These units, which can be made to read temperature directly, can have various electrification controls which permit a wide variety of temperatures to be established within the oven 32 and on the spikes 14.

It will also be apparent to those skilled in the art that if the food product is one which only requires internal or external heating, but not both, that the proper combination of switches 48 and 50, as well as individual switches 13, can achieve this selective heating environment. For example, the throwing of switch 48 by itself only energizes the oven element 32 (through its left pole) and accordingly provides a heated environment only within the oven 18, leaving the spikes 14 as straightforward carrying elements or "slaves." On the other hand, there may be food products where only internal heating is desired. This can be readily achieved by the present invention by the throwing of switch 50 and individual switches 13, while at the same time leaving switch 48 in its open-circuited position; the internal heating is achieved through the right pole of switch 50.

It is also noted that the air curtain fan motor 46 is energized whenever either of the switches 48 or 50 is thrown (i.e., through the right pole of switch 48 or the left pole of switch 50. This permits all heating activities, which take place within the oven 18, to be isolated from the outside environment. When the switch 48 has been thrown to energize the heating element 32 within the oven 18, the oven heat will be retained therein as previously indicated. Moreover, even when switch 50 is the only one activated, it is desirable to isolate the cooking step (achieved by the individualized heating of the spikes 14) within the confines of the oven 18 isolated from the outside air and possible contaminants.

A typical cooking cycle for a food product such as a frankfurter (and an accompanying bun or buns) may illustratively begin with the conveyor belt 12 in motion as previously indicated. At the end of the apparatus where the belt passes over shaft 44a (the "feed" end), both the frankfurters 24 and acompanying rolls or buns (not shown) can be placed in the respective carrying elements, namely spikes 14 and saddles 16, and the individual switch 13 is thrown. The speed of the conveyor belt is adjustable by the adjustment of the motor 44. The speed will vary depending upon the nature of the food product involved; by using a commercially available "vari-drive" motor, a typical belt speed range between 6 and 18 inches per minute can be achieved. This speed variation, which is only illustrative, is sufficient to cover an extremely wide variety of existing and future food products.

The mounted food products (the description hereinafter wil be confined to the frankfurters 24) then pass into the oven 18 through entry port 18a and are isolated from the outside environment by an air curtain at that point. When the base of the spike 14 passes into the contact heating strip 28 as shown in FIG. 3, individualized heating of the spike and accordingly of the mounted frankfurter 24 begins almost instantaneously. Moreover, external heating attributable to heating element 32 is taking place within the oven 18. When the conveyor belt 12 transports its now cooked food product out of the oven 18 through exit port 18b (and the corresponding air curtain), the belt passes around shaft 44b (the "discharge" end) of the apparatus 10. The frankfurter 24 as shown in phantom at the discharge end of the apparatus as illustrated in FIG. 2 is removed from the belt 12 by the passage of its spike into the bifurcated space of discharge fork 22 (see FIG. 1). As the spike 14 passes through the space between the forked tines 22a and 22b of the discharge fork 22, the impaled frankfurter 24 is gradually forced upward on the shaft 15 of the spike 14 and is eventually removed therefrom and deposited into a suitable collection pan (not shown). Well-known means can be placed in the path of switches 13 at the discharge end to deactivate the switches; any unit whose lamp 11 had not properly lit during passage through the oven can be removed for maintenance. Cleaning of the spikes takes place in a well-known manner within cleaning station 29 whereby the brushes 30 remove the various undesirable food particles which may remain on the spikes after the cooking cycle has terminated.

Accordingly, the present invention provides for individualized electrification of individual food-carrying elements (spikes 14) and for selective control over the temperatures to be applied (by control units 54 and 56) to both these internal heating elements and the external heating oven (oven 18). While the cooking cycles above have been described with relation to frankfurters and corresponding frankfurter rolls, it is obvious that various other food products can be cooked in this manner, both by manual control and in response to automatic supervisory equipment (e.g., coin-operated apparatus). Moreover, various additional types of food-carrying elements other than the spikes 14 and saddles 16 can be utilized so as to permit the present invention to be utilized in connection with an unlimited variety of food products.

It is to be understood that the above-described arrangements are illustrative of the application of the principles of the invention. Numerous other arrangements may be devised by those skilled in the art without departing from the spirit and scope of the invention.

What is claimed is:

1. Apparatus for processing food products comprising conveyor means, power means to drive said conveyor means, at least one support means mounted on said conveyor means for impaling at least one of said food products thereon, heating station means in the transport path of said conveyor means, and control means for furnishing a heated environment at said heating station means and for individually heating each of said support means independently of said heated environment, whereby each of said food products can be selectively cooked internally by said individually heated support means and externally by said heated environment at said heating station means.

2. Apparatus for processing food products comprising conveyor means, power means to drive said conveyor means, at least one support means mounted on said conveyor means for receiving at least one of said food products thereon, said support means including an elongated spike portion mounted above said conveyor means for carrying said food products and a downwardly projecting terminal member having first and second contact points thereon, heating station means in the transport path of said conveyor means, said heating station means being formed with a heating chamber surrounding at least a portion of said transport path and including at least one heating element within said heating chamber and a mounting element disposed along the path of said support means of said conveyor means and having first contact means for contacting said first contact point of said terminal member when said support mean passes through said heating station means and having second contact means for completing a circuit to a power source by contacting said second contact point of said terminal member when said support means passes through said heating station means and control means for furnishing a heated environment at said heating station means and for individually heating each of said support means independently of said heated environment, whereby each of said food products can be selectively cooked internally by said individually heated support means and externally by said heated environment at said heating station means.

3. Apparatus in accordance with claim 2 wherein said conveyor means includes an endless belt, wherein said terminal member of said support means includes a cylindrical surface electrically connected to said spike portion and insulated from said conveyor means to establish said first contact point and a conductive nipple electrically connected to said spike portion and insulated from said conveyor means and from said cylindrical surface to establish said second contact point, and including in addition switching means for individually controlling the heating of each of said support means and means responsive to said switching means for indicating the heating state of each of said support means.

4. Apparatus in accordance with claim 2 including in addition discharge means disposed in said transport path for removing said food products therefrom, and cleaning station means in said transport path for cleaning said support means subsequent to the removal of said food products.

5. Apparatus in accordance with claim 4 including in addition collection means for receiving cooked ones of said food products, wherein said discharge means includes a bifurcated discharge fork having first and second tines creating an angular space therebetween, said food products being removed by the passage of said spike portion carrying said food products through said space whereby said food products are gradually moved upward along said spike portion until said food products are completely removed and deposited in said collection means.

6. Apparatus in accordance with claim 2 wherein said heating station means includes a cooking oven having an entry port and an exit port and air movement means for providing a first air curtain at said entry port and a second air curtain at said exit port whereby said heated environment is preserved within said oven.

7. Apparatus in accordance with claim 6 wherein said air movement means includes a fan, a duct and a divider elevated from said duct whereby air from said fan is directed in substantially equal streams to said first air curtain at said entry port and to said second air curtain at said exit port.

References Cited
UNITED STATES PATENTS

| | | | |
|---|---|---|---|
| 1,797,140 | 3/1931 | Graefe | 99—420 |
| 1,854,850 | 4/1932 | Linkenauger | 99—420 |
| 2,022,940 | 12/1935 | Persiani | 99—342 |
| 2,146,427 | 2/1939 | Hawkins | 219—398 |
| 2,582,462 | 1/1952 | Schrumn. | |
| 2,720,158 | 10/1955 | Finizie | 99—421 |

WALTER A. SCHEEL, *Primary Examiner.*

J. M. NEARY, *Assistant Examiner.*